(12) United States Patent
Sharma et al.

(10) Patent No.: US 11,687,595 B2
(45) Date of Patent: Jun. 27, 2023

(54) SYSTEM AND METHOD FOR SEARCHING BACKUPS

(71) Applicant: EMC IP Holding Company LLC, Hopkinton, MA (US)

(72) Inventors: Manish Sharma, Bangalore (IN); Shelesh Chopra, Bangalore (IN); Aaditya Rakesh Bansal, Bangalore (IN); Sunil Yadav, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 280 days.

(21) Appl. No.: 16/669,460

(22) Filed: Oct. 30, 2019

(65) Prior Publication Data

US 2021/0133248 A1    May 6, 2021

(51) Int. Cl.
*G06F 16/90* (2019.01)
*G06F 16/9035* (2019.01)
*G06F 16/901* (2019.01)
*G06F 11/14* (2006.01)

(52) U.S. Cl.
CPC ...... *G06F 16/9035* (2019.01); *G06F 11/1435* (2013.01); *G06F 16/9017* (2019.01); *G06F 2201/80* (2013.01)

(58) Field of Classification Search
CPC ............. G06F 16/9035; G06F 16/9017; G06F 11/1435
See application file for complete search history.

(56) References Cited

U.S. PATENT DOCUMENTS

| | | |
|---|---|---|
| 6,408,336 B1 | 6/2002 | Schneider et al. |
| 8,554,918 B1 | 10/2013 | Douglis |
| 8,812,455 B1 | 8/2014 | Claudatos et al. |
| 9,298,707 B1 | 3/2016 | Zhang et al. |
| 9,430,332 B1 | 8/2016 | Bahadure |
| 9,772,791 B2 | 9/2017 | Resch |
| 9,977,704 B1 | 5/2018 | Chopra et al. |
| 10,102,083 B1 | 10/2018 | Dobrean et al. |
| 10,320,757 B1 | 6/2019 | Seeker-walker |
| 10,417,213 B1 | 9/2019 | Mukku et al. |
| 10,489,066 B1 | 11/2019 | Krinke |
| 10,572,350 B1 | 2/2020 | Bansal et al. |
| 10,642,698 B1 | 5/2020 | Chopra et al. |
| 11,265,148 B1 | 3/2022 | Griffin et al. |
| 11,297,459 B2 | 4/2022 | Raduchel et al. |
| 2008/0086609 A1 | 4/2008 | Lesser et al. |
| 2010/0058114 A1 | 3/2010 | Perkins et al. |
| 2010/0250497 A1 | 9/2010 | Redlich et al. |
| 2011/0113012 A1 | 5/2011 | Gruhl et al. |
| 2011/0131185 A1 | 6/2011 | Kirshenbaum |
| 2011/0213928 A1 | 9/2011 | Grube et al. |

(Continued)

*Primary Examiner* — Log Tran
(74) *Attorney, Agent, or Firm* — Chamberlain, Hrdlicka, White, Williams & Aughtry

(57) ABSTRACT

A backup manager for providing backup services includes persistent storage and a backup orchestrator. The persistent storage includes protection policies. The backup orchestrator generates a backup for a client based on the protection policies; obtains system metadata from the client; generates a backup map for the backup based on the system metadata; generates a backup hierarchy for the backup based on the backup map; and stores the backup and at least one selected from a group consisting of the backup hierarchy and the backup map.

14 Claims, 11 Drawing Sheets

(56) References Cited

U.S. PATENT DOCUMENTS

| | | |
|---|---|---|
| 2013/0091536 A1 | 4/2013 | Manjunath |
| 2014/0115029 A1 | 4/2014 | Baldwin et al. |
| 2014/0136832 A1 | 5/2014 | Klum et al. |
| 2014/0310800 A1 | 10/2014 | Kabra et al. |
| 2014/0351632 A1 | 11/2014 | Grube et al. |
| 2015/0046192 A1 | 2/2015 | Raduchel |
| 2015/0066865 A1 | 3/2015 | Yara |
| 2015/0066866 A1 | 3/2015 | Yara |
| 2015/0169898 A1 | 6/2015 | Lembcke |
| 2015/0242648 A1 | 8/2015 | Lemmey |
| 2016/0034133 A1 | 2/2016 | Wilson et al. |
| 2016/0132521 A1 | 5/2016 | Reininger |
| 2016/0179416 A1 | 6/2016 | Mutha et al. |
| 2016/0274978 A1 | 9/2016 | Strohmenger et al. |
| 2016/0357971 A1 | 12/2016 | Sinha et al. |
| 2016/0371500 A1 | 12/2016 | Huang et al. |
| 2017/0371547 A1 | 12/2017 | Fruchtman et al. |
| 2018/0032446 A1* | 2/2018 | Amarendran ............ G06N 5/02 |
| 2018/0067848 A1 | 3/2018 | Baldwin |
| 2018/0089044 A1 | 3/2018 | Guim Bernat et al. |
| 2018/0157860 A1 | 6/2018 | Nair et al. |
| 2018/0159729 A1 | 6/2018 | Deshmukh et al. |
| 2018/0225177 A1 | 8/2018 | Bhagi et al. |
| 2018/0232528 A1 | 8/2018 | Williamson et al. |
| 2019/0057101 A1 | 2/2019 | Esserlieu et al. |
| 2019/0158596 A1 | 5/2019 | Mcshane et al. |
| 2019/0205056 A1 | 7/2019 | Halstuch |
| 2019/0312910 A1 | 10/2019 | Convertino et al. |
| 2019/0332683 A1 | 10/2019 | Thummala et al. |
| 2019/0354708 A1 | 11/2019 | Fisher et al. |
| 2020/0012431 A1 | 1/2020 | Chopra et al. |
| 2020/0233975 A1 | 7/2020 | Rosenthol et al. |
| 2020/0241908 A1 | 7/2020 | Dornemann et al. |
| 2020/0241975 A1 | 7/2020 | Basham et al. |
| 2020/0285771 A1 | 9/2020 | Dey et al. |
| 2020/0301882 A1 | 9/2020 | Pogde et al. |
| 2020/0302082 A1 | 9/2020 | Carteri et al. |
| 2020/0320208 A1 | 10/2020 | Bhosale et al. |
| 2021/0034571 A1 | 2/2021 | Bedadala et al. |
| 2021/0035089 A1 | 2/2021 | Johnston |
| 2021/0117277 A1 | 4/2021 | Shetty et al. |
| 2021/0133040 A1 | 5/2021 | Bansal et al. |
| 2021/0133248 A1 | 5/2021 | Sharma et al. |

\* cited by examiner

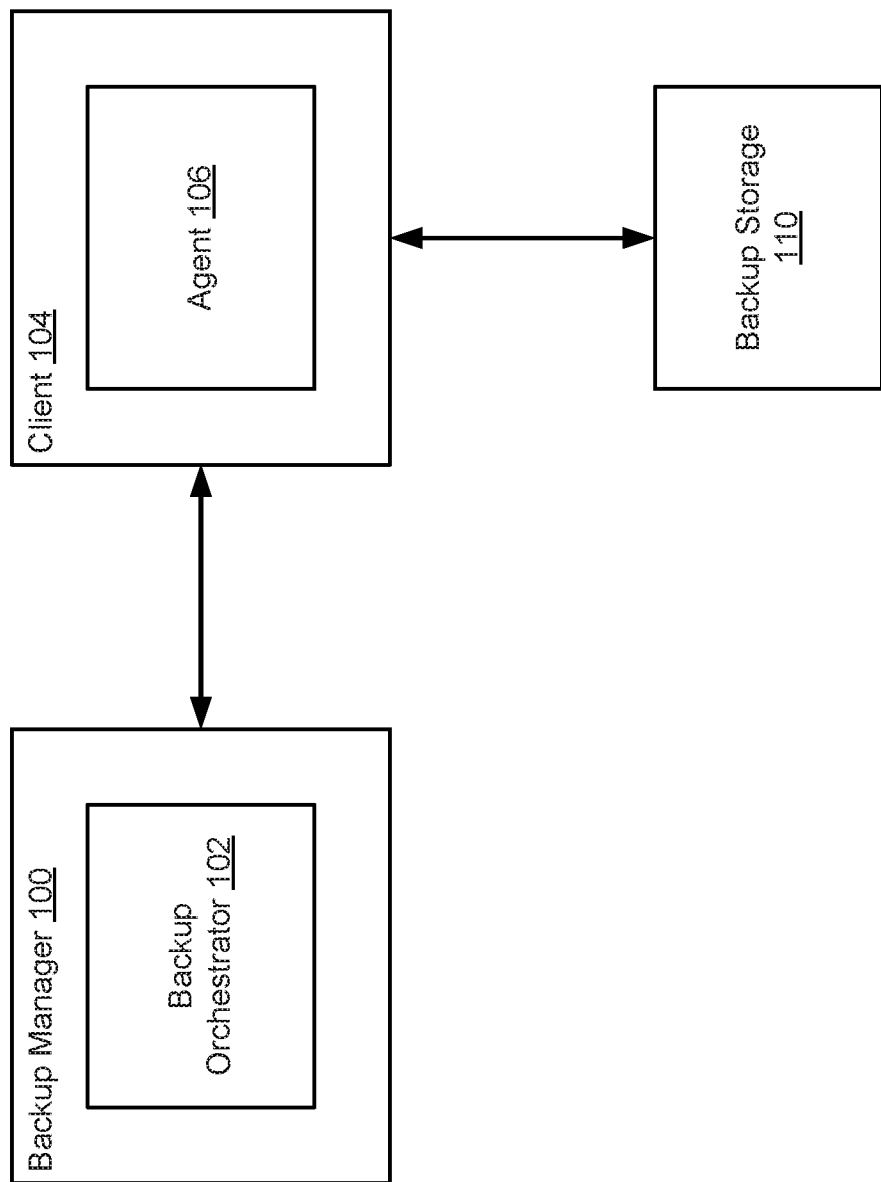
FIG. 1.1

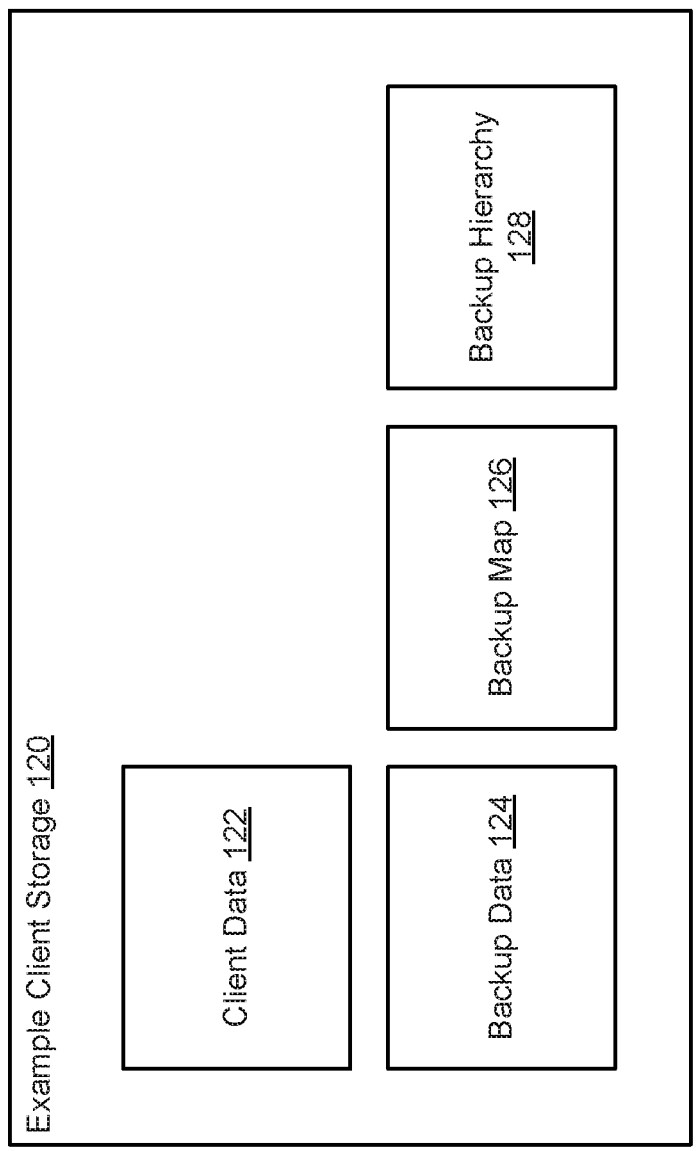

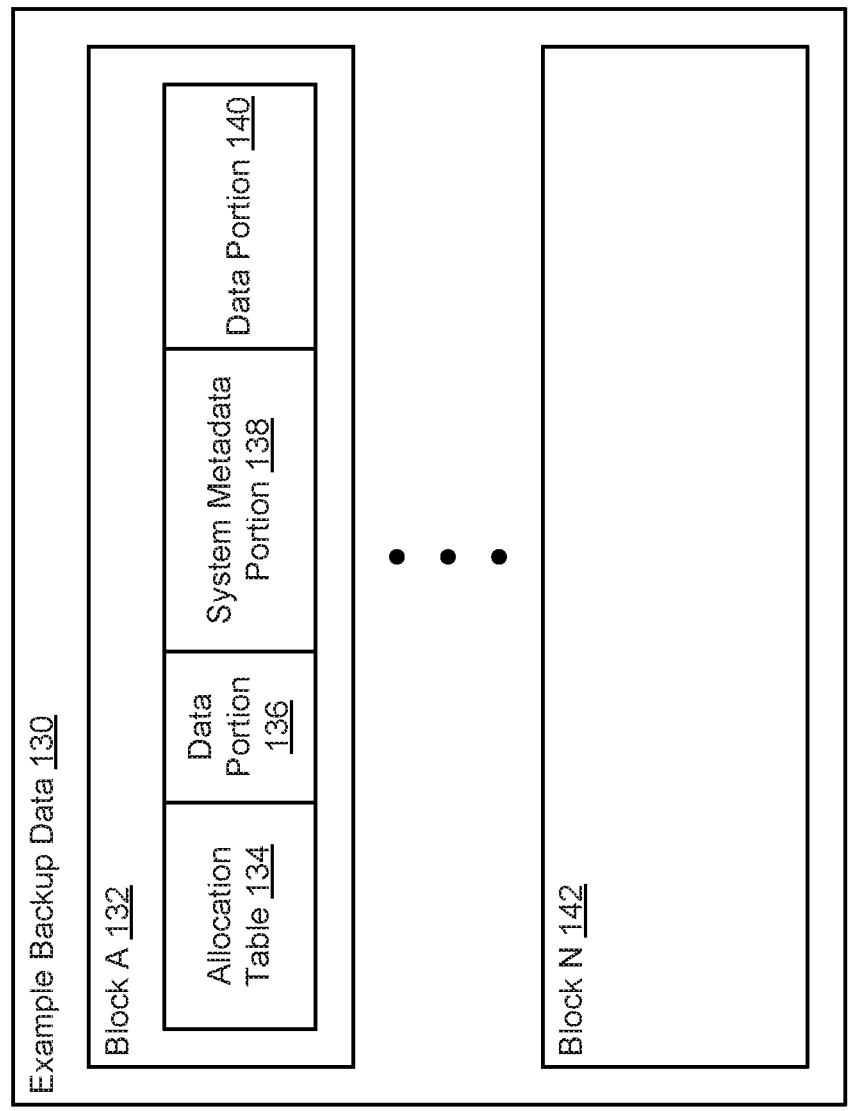
FIG. 1.3

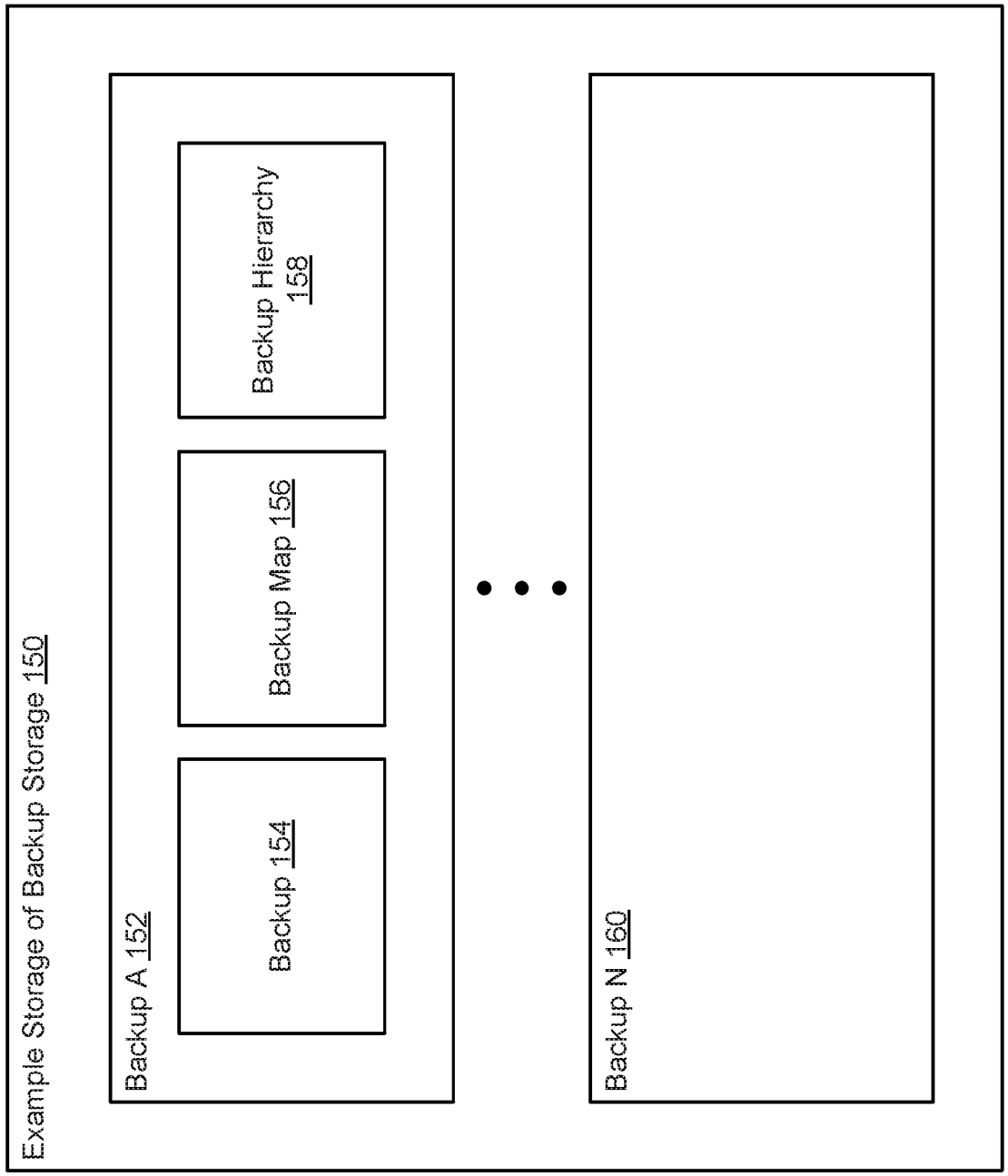
FIG. 1.4

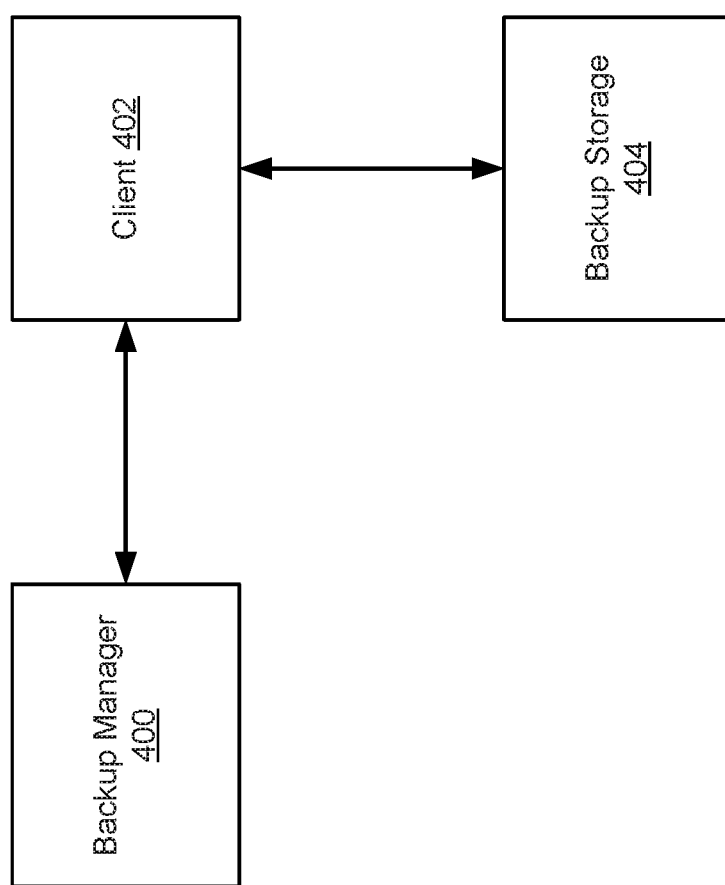
FIG. 4.1

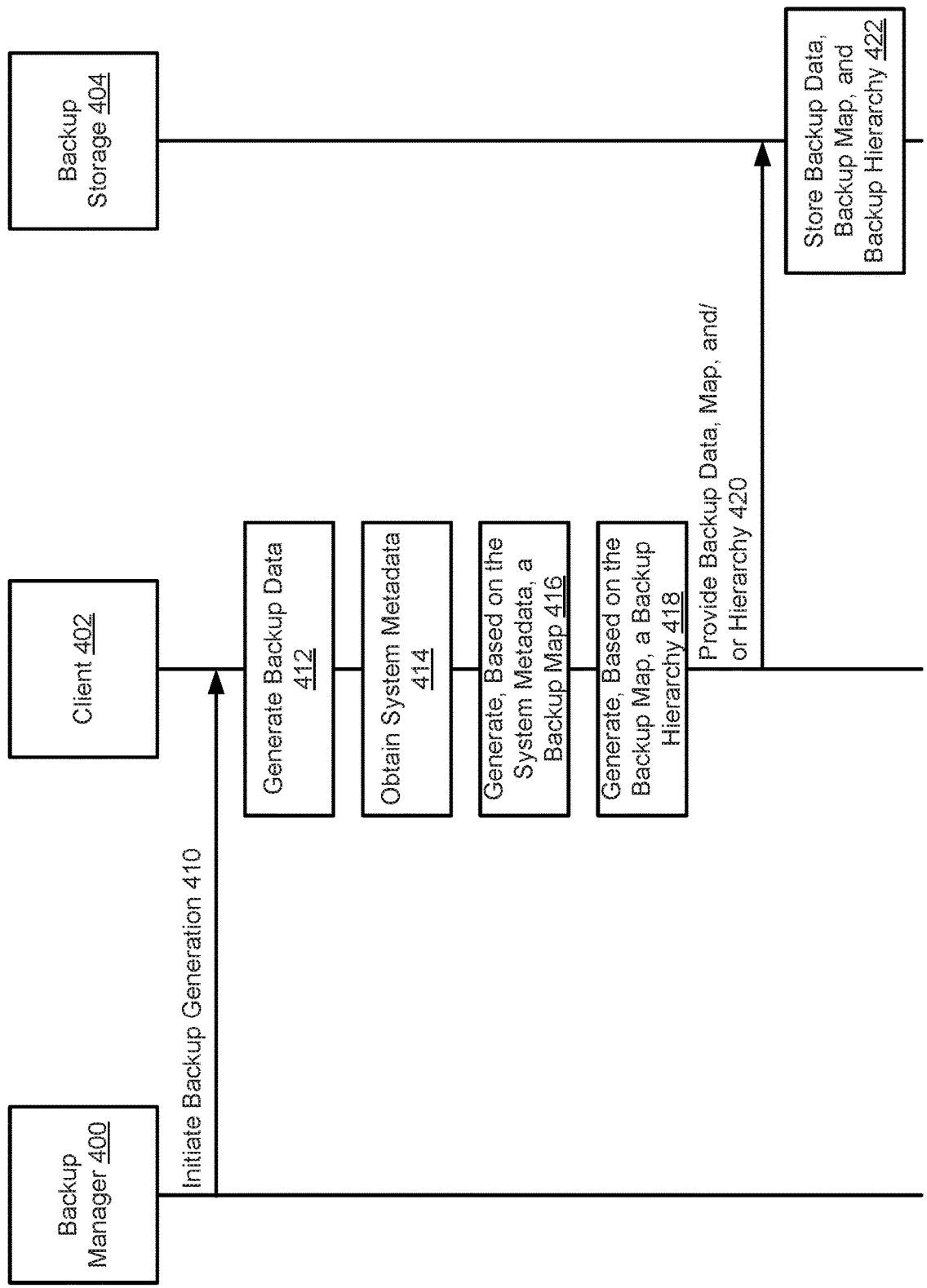
FIG. 4.2

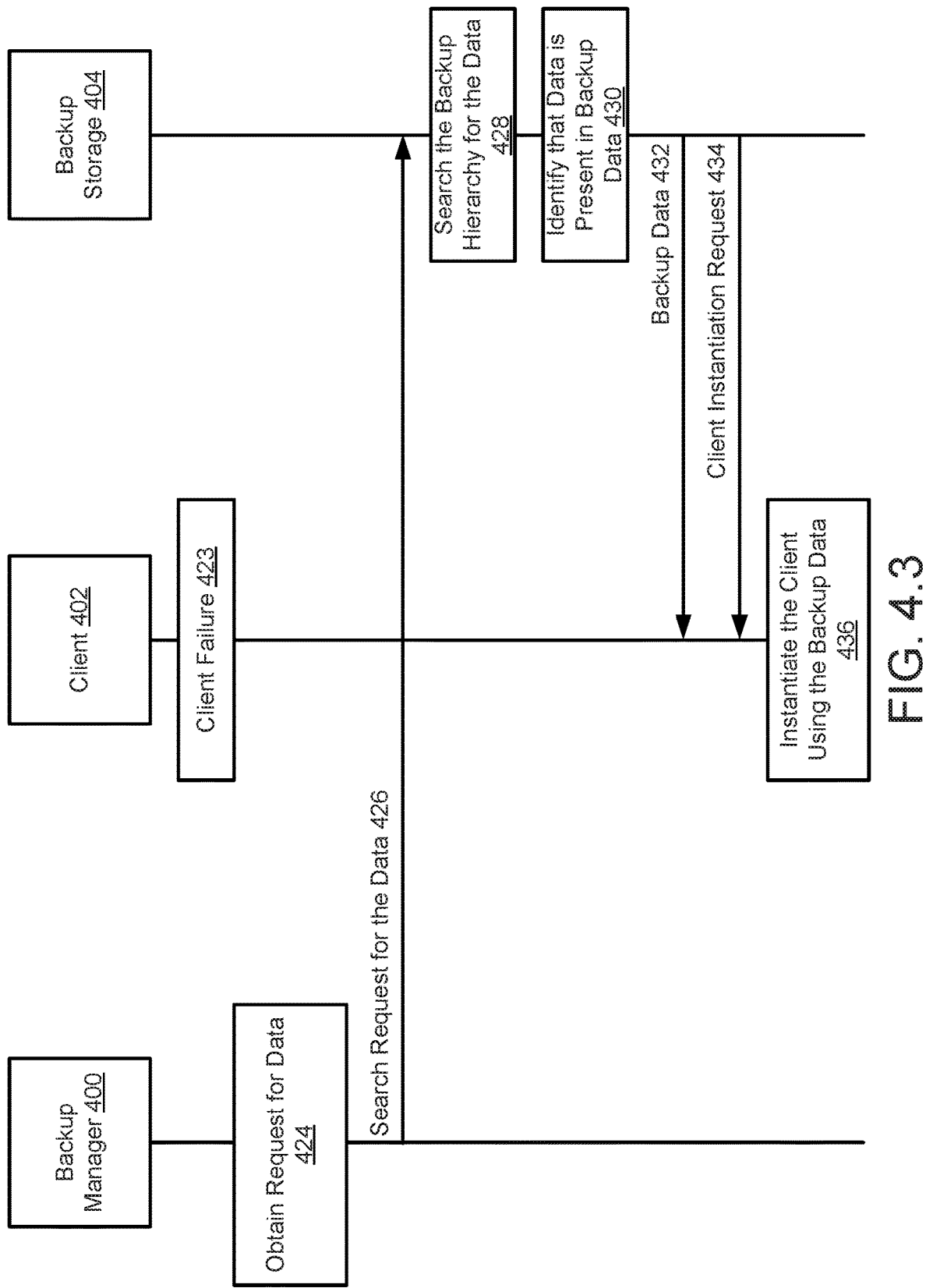
FIG. 4.3

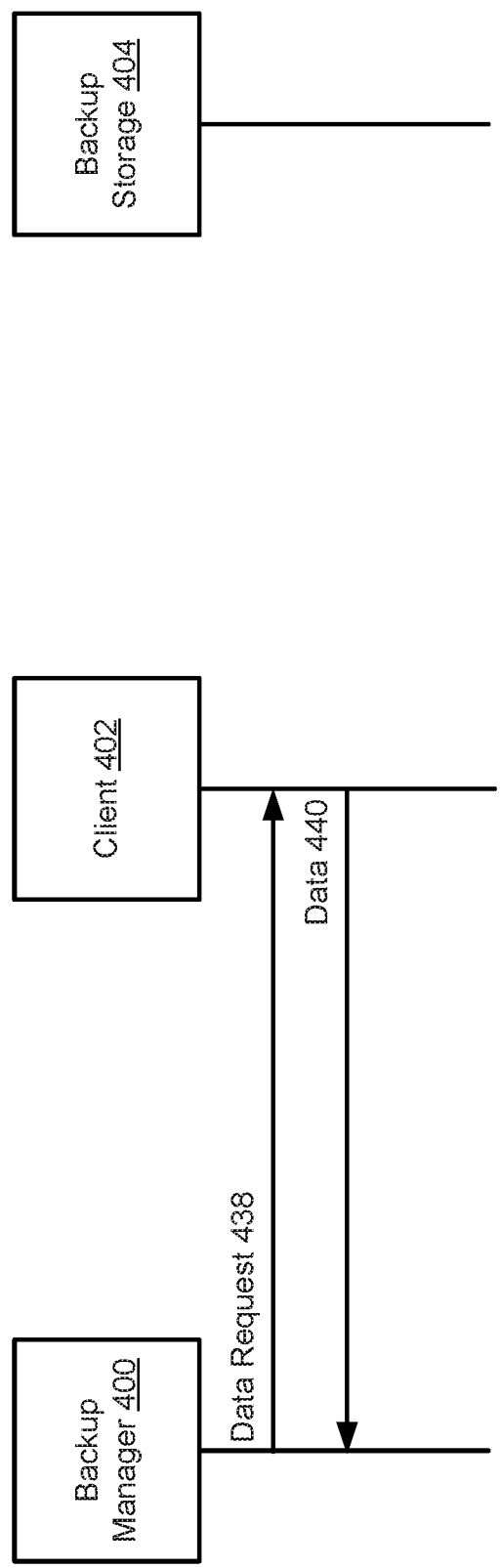
FIG. 4.4

SYSTEM AND METHOD FOR SEARCHING BACKUPS

BACKGROUND

Devices may generate information based on existing information. For example, devices may obtain information and derive information based on the obtained information. To obtain information, devices may be able to communicate with other devices. The communications between the devices may be through any means.

SUMMARY

In one aspect, a backup manager for providing backup services in accordance with one or more embodiments of the invention includes persistent storage and a backup orchestrator. The persistent storage includes protection policies. The backup orchestrator generates a backup for a client based on the protection policies; obtains system metadata from the client; generates a backup map for the backup based on the system metadata; generates a backup hierarchy for the backup based on the backup map; and stores the backup and at least one selected from a group consisting of the backup hierarchy and the backup map.

In one aspect, a method for providing backup services in accordance with one or more embodiments of the invention includes generating a backup for a client based on a protection policy associated with the client; obtaining system metadata from the client; generating a backup map for the backup based on the system metadata; generating a backup hierarchy for the backup based on the backup map; and storing the backup and at least one selected from a group consisting of the backup hierarchy and the backup map.

In one aspect, a non-transitory computer readable medium in accordance with one or more embodiments of the invention includes computer readable program code, which when executed by a computer processor enables the computer processor to perform a method for providing backup services. The method includes generating a backup for a client based on a protection policy associated with the client; obtaining system metadata from the client; generating a backup map for the backup based on the system metadata; generating a backup hierarchy for the backup based on the backup map; and storing the backup and at least one selected from a group consisting of the backup hierarchy and the backup map.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an example client storage in accordance with one or more embodiments of the invention.

FIG. 1.3 shows a diagram of an example backup in accordance with one or more embodiments of the invention.

FIG. 1.4 shows a diagram of an example storage of a backup storage in accordance with one or more embodiments of the invention.

FIG. 4.1 shows a diagram of an example system.

FIGS. 4.2-4.4 show diagrams of interactions between and actions performed by components of the example system of FIG. 4.1 over time.

DETAILED DESCRIPTION

Figure 2:
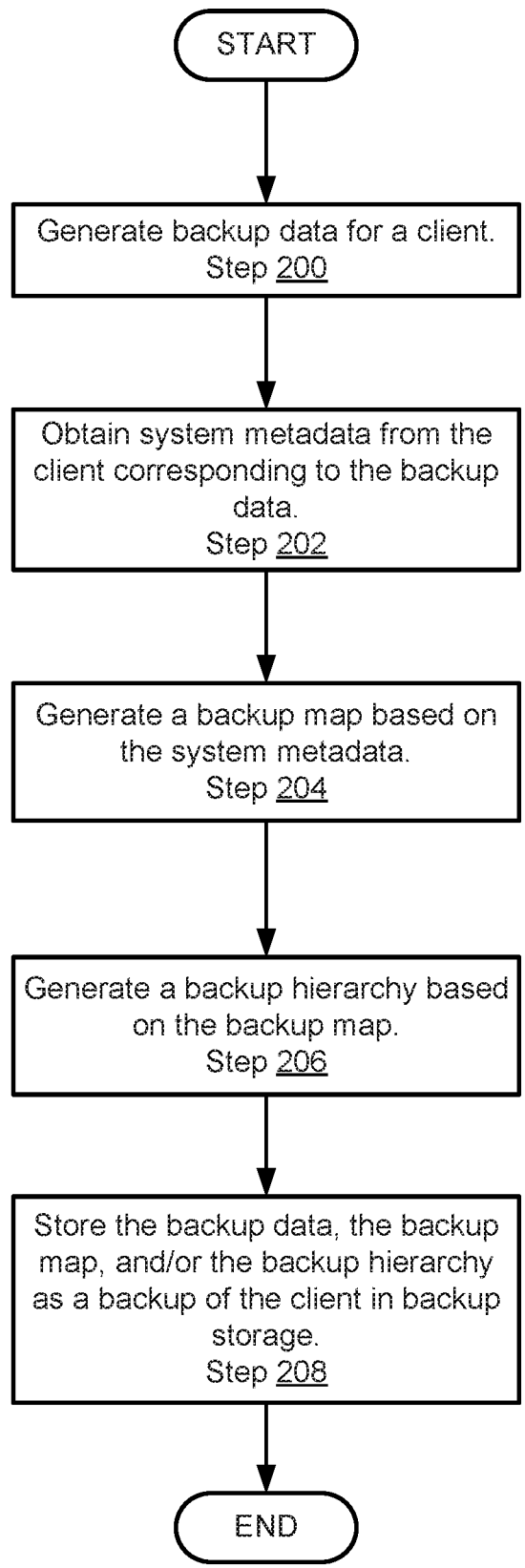
FIG. 2 shows a flowchart of a first method of providing backup services in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing backup services to clients or other types of devices. Backup services may include generating backups of the clients, storing the backups, using the backups to restore clients to previous states, and enabling the contents of the backups to be searched.

Embodiments of the invention may provide a method for generating and storing backups in a searchable format. A backup may be a data structure that may be used to restore an entity (e.g., place the entity into a different operating state). The backup may include any number of logical portions (e.g., files). To determine whether to restore an entity, the contents of the backups may be searched to ascertain whether restoring the entity using the backup would enable desirable data to be accessed via the restored entity.

Embodiments of the invention may provide a method for generating searchable backups in a computationally efficient manner. To do so, a system in accordance with embodiments of the invention may utilize existing information (e.g., system metadata), used by an entity for which the backup is generated to organize its data, to facilitate searching of the backup rather than generating new information. By doing so, computationally expensive processes such as, for example, crawling of the contents of the backups to obtain information regarding the contents of a backup may be avoided.

FIG. 1.1 shows a system in accordance with one or more embodiments of the invention. The system may include a client (104) that utilizes backup services provided by the backup manager (100), a backup orchestrator (102) hosted by the backup manager (100) that facilitates orchestration of backup generation, an agent hosted by the client (104) that cooperates with the backup orchestrator (102) to generate and store backups, and/or a backup storage (110) for storing backups and/or other types of data. The backup services may include (i) generation of backups of the client (104), (ii) storing the backups in a backup storage (110), (iii) utilizing backups of the client (104) stored in the backup storage (110) to restore the client (104), (iv) generating data structures used to enable backups to be searched for desired data in a computationally efficient manner, and/or (v) searching portions of stored backups for the data that may be of interest to the client (104) and/or other entities.

For example, backups of the client (104) may be data structures that include data reflecting the state of the client (104) at a point of time (e.g., a full backup) and/or changes in the state of the client (104) over a period of time (e.g., an incremental backup). Different portions of the backup may correspond to different portions of the client's (104) data (e.g., files of a file system is used to organize the client's data or other types of data structures that may be employed by other types of data organization systems) at the point in time or over the period of time.

The backups may be used to change the data of the client (104) to reflect the data at periods of/points in time associated with backups. Once changed, the state of the client (104) may be similar to the state of the client (104) when the backups were generated. Thus, the backups may be used to restore the operational state of the client (104) to previous operational states. The aforementioned functionality may be desirable, for example, to respond to scenarios in which the client (104) becomes inoperable due to data corruption, hardware issues that prevent the client (104) from operating, and/or for other reasons.

In some scenarios, it may be desirable to ascertain whether the client (104), during a previous operating state associated with backups stored in the backup storage (110), stored a particular portion of data. For example, the particular portion of data may be a version of a database, a file, or another type of data structure. The aforementioned determination may be used, for example, to select to which operating state to restore the client (104) when performing a restoration of the client (104), enable access to the particular portion of data by extracting it from a backup, and/or for other purposes.

To enable the backups to be searched, the system may store metadata (e.g., a backup map and/or a backup hierarchy) regarding the contents of the backups that are stored in backup storage (110). The metadata may enable the contents of the backups to be searched without crawling the contents of the backups or employing other computationally costly search algorithms.

To store the metadata, embodiments of the invention may provide a method of generating the metadata without crawling the contents of the backups. The method may generate the metadata by utilizing existing, system metadata employed by the client (104) to organize the client data. Consequently, a system in accordance with embodiments of the invention may provide search functionality for backups of the client (104) in a manner that is computationally efficient.

Each of the components of the system may be operably connected to each other and/or other entities not shown using any combination and quantity of wired and/or wireless networks. Each component of the system is discussed below.

The client (104) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 2-3. The client (104) may be implemented using other types of computing devices without departing from the invention. For additional details regarding computing devices, refer to FIG. 5.

The client (104) may be implemented using logical devices without departing from the invention. For example, the client (104) may be implemented using virtual machines that utilize computing resources of any number of physical computing devices to provide the functionality of the client (104). The client (104) may be implemented using other types of logical devices without departing from the invention.

In one or more embodiments of the invention, the client (104) provides computer implemented services. A computer implemented service may be, for example, managing a database, serving files, and/or providing other types of services that may be utilized by users (e.g., other computing devices employed by users to utilize the services provided by the client (104) and/or other entities). The computing implemented services may be other types of services without departing from the invention.

When providing computer implemented services, the client (104) may generate and store data which the client (104) utilizes to provide the computer implemented services. For example, to provide database services, the client (104) may store information from a user in a database. The user may desire access to the information in the future. Consequently, the future availability of the data may be valuable to the client (104).

Similarly, other entities may desire access to all, or a portion, of the client's data at future points in time. For example, other entities may desire to obtain access to information included in a database hosted by the client (104).

To improve the likelihood that such data is available in the future, the client (104) may utilize backup services provided by the backup manager (100). As discussed above, the backup services provided by the backup manager (100) may include orchestration of backup generation, storage of backups in the backup storage (110), and/or providing access to backups and/or information included in the backups (e.g., particular files).

To assist the backup manager (100) in providing backup services, the client (104) may host an agent (106). The agent (106) may orchestrate generation of backups of the client (104). To do so, the agent (106) may invoke functionality of the client (104) to generate the backup. For example, the agent (106) may invoke the functionality of the client (104) to cause the client (104) to enter a consistent state (e.g., flush buffers or other in-memory data structures) and generate a backup of all, or a portion, of the client's data. Once generated, the agent (106) may generate a backup map and/or a backup hierarchy.

The backup map may include information regarding the content (e.g., different logical portions of the backup such as files) of the backup. The backup hierarchy may include access information for various portions of the content of the backup.

To generate the backup map, the agent (106) may utilize system metadata (or other types of metadata used to organize/describe logical portions of the client's data included in the backup). For example, an operating system or other organizational entity hosted by the client may manage the client's data by generating system metadata. The system metadata may specify information (e.g., creation date, file name, access information, creation time/date, last modification, etc.) regarding each of the portions of the client's data. The client's (104) system metadata may be obtained by the agent (106) and used to generate the backup map.

To generate the backup hierarchy, the agent (106) may utilize system metadata included in the backup map to identify different portions of the backup that correspond to the various portions of the client's data. For example, the client and the backup may utilize a similar organizational scheme for storing data. Consequently, the client's system metadata may specify the locations of the client's data within its storage resources as well as the relative locations within the backup that store copies of the client's data. Thus, the system data included in the backup map may be used to generate a data structure (i.e., the backup hierarchy) that includes access information for each portion of the client's data included in the backup.

For additional details regarding backups, backup maps, and backup hierarchies, refer to FIGS. 1.2-1.4.

The agent (106) may be implemented using a logical entity. For example, the agent (106) may be implemented using computer instruction stored in persistent storage that when executed by a processor of the client (104) gives rise to the agent (106). The agent (106) may be implemented using a physical device. For example, the agent (106) may be implemented using an integrated circuit having circuitry adapted to provide the functionality of the agent (106). The circuitry may be adapted to provide the functionality of the agent (106) by including different portions of circuitry that provide different portions of the functionality of the agent (106).

Figure 3:
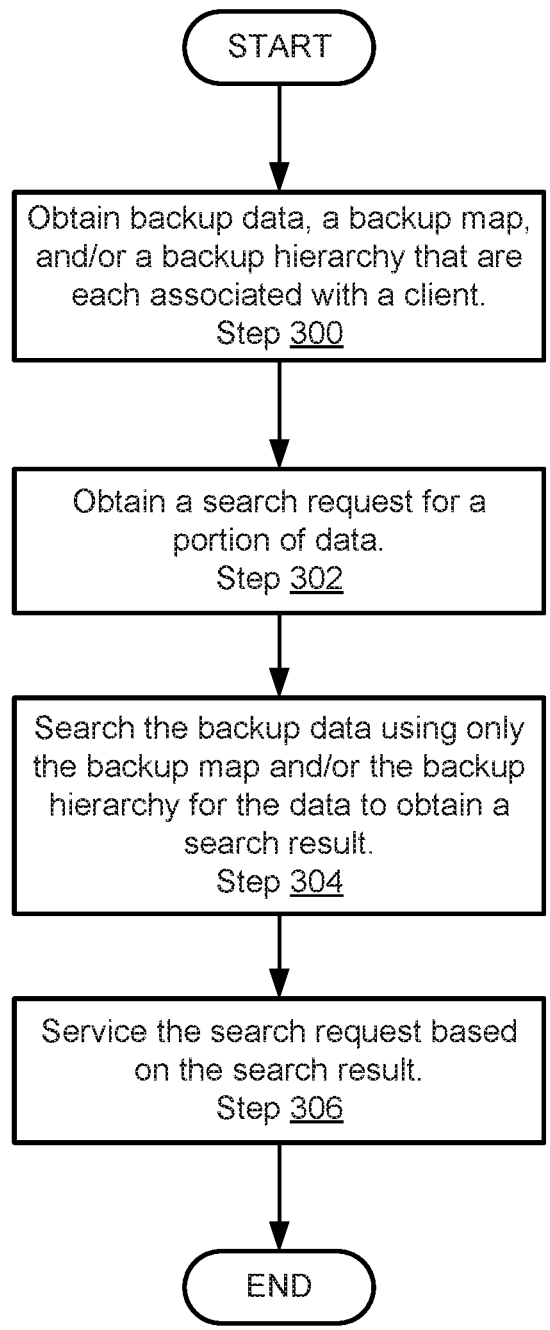
FIG. 3 shows a flowchart of a second method of providing backup services in accordance with one or more embodiments of the invention.

When providing its functionality, the agent (106) may perform all, or a portion, of the methods illustrated in FIGS. 2-3.

While the client (104) is illustrated in FIG. 1.1 as including an agent (106), the client (104) may include additional, fewer, and/or different components from those discussed above without departing from the invention.

The backup manager (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 2-3. The backup manager (100) may be implemented using other types of computing devices without departing from the invention. For additional details regarding computing devices, refer to FIG. 5.

The backup manager (100) may be implemented using logical devices without departing from the invention. For example, the backup manager (100) may be implemented using virtual machines that utilize computing resources of any number of physical computing devices to provide the functionality of the backup manager (100). The backup manager (100) may be implemented using other types of logical devices without departing from the invention.

In one or more embodiments of the invention, the backup manager (100) provides backup services to the client (104) and/or other entities. Providing backup services may include (i) orchestrating generation of backups of the client (104), (ii) orchestrating storage of the backups in the backup storage (110), (iii) searching backups stored in the backup storage (110) for portions of data (e.g., particular files), (iv) providing data from the backups stored in the backup storage (110), and/or (v) orchestrating restoration of the client (104) using the backups stored in the backup storage (110).

To provide its functionality, the backup manager (100) may include a backup orchestrator (102) that provides the above noted functionality of the backup manager (100) and/or includes functionality to send messages to entities (e.g., an agent (106)) hosted by the client (104) to invoke functionality of the entities (e.g., agent (106)). For example, the agent (106) hosted by the client (104) may service requests from the backup manager (100). The agent (106) may, upon receipt of such requests, invoke functionality of the client (104) and/or its own functionality to service the requests from the backup manager (100).

When providing its functionality, the backup manager (100) may utilize protection policies. Protection policies may be data structures that specify how backups are to be generated and stored. For example, protection policies may specify when backups are to be generated, where backups are to be stored, and/or other information. The protection policies may trigger the backup manager (100) to generate backups for the client (104) and/or other entities.

The backup storage (110) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 2-3. The backup storage (110) may be implemented using other types of computing devices without departing from the invention. For additional details regarding computing devices, refer to FIG. 5.

The backup storage (110) may be implemented using logical devices without departing from the invention. For example, the backup storage (110) may be implemented using virtual machines that utilize computing resources of any number of physical computing devices to provide the functionality of the backup storage (110). The backup storage (110) may be implemented using other types of logical devices without departing from the invention.

In one or more embodiments of the invention, the backup storage (110) provides data storage services to the client (104) and/or other entities. Data storage services may include storing data and providing copies of previously stored data. For example, backups of the client (104) and/or other entities may be stored in the backup storage (110) for storage. Similarly, backup maps and/or backup hierarchies associated with the client (104) may also be stored in the backup storage (110). Copies of the backup maps and/or backup hierarchies may also be stored in the backup manager (100).

In addition to data storage services, the backup storage (110) may also provide search functionality. The search functionality may enable the contents of the backups stored in backup storage to be searched. When providing search functionality, the backup storage (110) may utilize backup maps and/or backup hierarchies to perform the search. The backups may not be searched directly. Rather, search requests may be serviced using only information included in the maps and hierarchies. Consequently, the search functionality provided by the backup storage (110) in a computationally efficient manner may be limited to dimensions supported by the maps and hierarchies. If the search results provided using computationally efficient searching (e.g., limited to using the maps/hierarchies), the backup storage (110) may utilize computationally costly direct searching of the backups by, for example, crawling the contents of the backups to service search requests.

For additional details regarding data stored in the backup storage (110), refer to FIG. 1.4.

While the system of FIG. 1.1 has been illustrated as including a limited number of specific components, a system in accordance with embodiments of the invention may include additional, fewer, and/or different components without departing from the invention. For example, the system may include any number of clients (e.g., 104), backup managers (e.g., 100) that provide backup services to all or a portion of the clients, backup storages (110) that provide backup services to any number of entities, and/or other entities without departing from the invention. Any of the aforementioned components may cooperate to provide the above noted and later described functionality of the system of FIG. 1.1.

As discussed above, the client (104) may generate backups, backup maps, and/or backup hierarchies as part of the process of backing up the client's (104) data. To further clarify aspects of data stored by the client, a diagram of an example storage of the client (104) is illustrated in FIG. 1.2.

Turning to FIG. 1.2, FIG. 1.2 shows a diagram of an example client storage (120) in accordance with embodiments of the invention.

In one or more embodiments of the invention, the example client storage (120) is implemented using devices that provide data storage services (e.g., storing data and providing copies of previously stored data). The devices that provide data storage services may include hardware devices and/or logical devices. For example, the example client storage (120) may include any quantity and/or combination of memory devices (i.e., volatile storage), long term storage devices (i.e., persistent storage), other types of hardware devices that may provide short term and/or long-term data storage services, and/or logical storage devices (e.g., virtual persistent storage/virtual volatile storage).

For example, the example client storage (120) may include a memory device (e.g., a dual in line memory device) in which data is stored and from which copies of previously stored data are provided. In another example, the example client storage (120) may include a persistent storage device (e.g., a solid state disk drive) in which data is stored and from which copies of previously stored data is provided. In a still further example, the example client storage (120) may include a memory device (e.g., a dual in line memory device) in which data is stored and from which copies of previously stored data is provided and a persistent storage device that stores a copy of the data stored in the memory device (e.g., to provide a copy of the data in the event that power loss or other issues with the memory device that may impact its ability to maintain the copy of the data cause the memory device to lose the data).

The example client storage (120) may store data structures including client data (122), backup data (124) (e.g., a backup), a backup map (126), and/or a backup hierarchy (128). Each of these data structures is discussed below.

The client data (122) may be a data structure that includes information generated/utilized by the client (104, FIG. 1.1). As discussed above, the client data (122) may include any type and quantity of information. For example, the client data (122) may include organizational information used to store data within the storage resources (e.g., blocks) of the example client storage (120), data, and system metadata utilized by an operating system or other type of organizational entity tasked with organizing/managing the client's data.

The backup data (124) may be a data structure that includes information regarding the state of the client (104, FIG. 1.1) at a point in time, changes to the state of the client (104, FIG. 1.1) over a period of time, and/or other types of information reflecting the state of the client. The backup data (124) may be usable, in isolation or in combination with other backups, to restore a state of the client (104, FIG. 1.1) to a previous state associated with the backup data (124) and/or other backup data generated at other points in time and/or stored in backup storage.

For example, backup data that reflects the state of the client (104, FIG. 1.1) at a point in time may include a copy of all, or a portion, of the client's data at a point in time (e.g., a full backup). Such backup data may be implemented as, for example, an image of the client (or a portion of the client).

In another example, backup data that reflects changes to the state of the client (104, FIG. 1.1) over a period of time may include changes made to all, or a portion, of the client data (122) over the period of time. Such backup data may be implemented as, for example, a list of modifications to all of the client data (122) (e.g., an incremental backup) or a list of modifications to a particular portion of the client data (122) (e.g., a transaction log from an application hosted by the client). Backup data that reflects changes to the state of the client over a period of time may be used in combination with at least one other portion of backup data that reflects the state of the client at a point in time (e.g., the state of the client at a point in time in combination with changes to the state of the client over a period of time may be used to derive the state of the client at a second point in time). Multiple portions of backup data that reflect changes to the state of the client over multiple periods of time may be used in combination (e.g., chaining) to derive the state of the client at any number of different points in time.

The backup data (124) may have an organizational structure that reflects the organizational structure utilized by the client (104, FIG. 1.1) to organize its data. Consequently, the backup data (124) may include organization data (e.g., allocation tables) that specifies the logical arrangement of client data (122) within the backup. For additional details regarding the arrangement of the client data (122) within the backup data (124), refer to FIG. 1.3.

The backup map (126) may be a data structure that includes system metadata from the client. The system metadata may specify where different portions of the client data (122) is disposed within the backup data (124) and/or information regarding the content of each of the different portions of the client's data because both the backup and the client may employ a similar organizational scheme for storing data.

For example, the backup map (126) may specify locations (e.g., offsets, lengths, etc.) of logical portions (e.g., files) of the client data (122) within the backup data (124). The backup map (126) may also specify information (e.g., name, creation date, type, description of the contents, etc.) regarding the content of each of the logical portions of the copy of the client data (122) stored as part of the backup data (124).

The backup map (126) may be used to enable the contents of the backup data (124) to be searched and/or to enable particular portions of the content of the backup data (124) to be extracted. For example, the backup map (126) may be implemented as a table that specifies both information regarding each portion of the copy of the client data (122) stored as part of the backup data (124) and where each portion of the copy of the client data (122) stored as part of the backup data (124) is disposed within the backup data (124). Consequently, when a desirable portion of the copy of the client data (122) stored as part of the backup data (124) is identified (e.g., through matching or other algorithms), the corresponding information regarding the location of the desirable portion may be used to read or otherwise access the portion of the backup data (124) corresponding to the desirable portion.

In one or more embodiments of the invention, the backup map (126) is generated without crawling (e.g., reading the copy of the client data (122) included in the backup data (124) and deriving information based on the read client data (122)) the backup data (124). Rather, the backup map (126) may be generated based on system metadata obtained from the client (e.g., obtained by sending requests to an operating system or other organizational entity of the client to provide the system metadata). By doing so, the backup map (126) may be generated without expending computing resources on analyzing the client data (122) included in the backup data (124) to generate information regarding the client data (122). For example, the preexisting system metadata that already includes information regarding the client data (122) may be utilized to generate the backup map (126).

The backup hierarchy (128) may be a data structure that includes access information for each portion of the copy of the client data (122) stored as part of the backup data (124). The backup hierarchy (128) may be generated using system metadata obtained from the backup map (126). To generate the backup hierarchy (128), the backup map (126) may be crawled to extract identifiers and access information from the system metadata included in the backup map (126).

While the example client storage (120) has been illustrated as including data structures including a limited amount of specific information, any of the data structures stored in the example client storage (120) may include addition, less, and/or different information without departing from the embodiments of the invention. Further, the aforementioned data structures may be combined, subdivided into any number of data structures, may be stored in other locations (e.g., in a storage hosted by another device), and/or spanned across any number devices without departing from embodiments of the invention. Any of the aforementioned data structures may be implemented using, for example, lists, tables, linked lists, databases, and/or other types of data structures.

To further clarify aspects of backups, a diagram of example backup data (130) in accordance with one or more embodiments of the invention is illustrated in FIG. 1.3. As discussed above, the example backup data (130) may store information regarding the state of the client (104, FIG. 1.1). In FIG. 1.3, the example backup data (130) reflects a state of the client (104, FIG. 1.1) at a point in time. However, the description provided below may be applicable to other types of backups that reflect changes to the client's state over corresponding periods of time.

The example backup data (130) may include any number of blocks (132, 142) that corresponding to blocks of an organization scheme employed by the client (104, FIG. 1.1) to store data. A block may be a chunk of storage resources (e.g., a number of bits). The size of the blocks may correspond to a minimum addressable unit of storage resources.

Each of the blocks (132, 142) may include bits that the client (104, FIG. 1.1) may use to store information. The client (104, FIG. 1.1) may store information using the bits of each of the blocks that reflects (i) organization information (e.g., any number of allocation tables (e.g., 134)) used by the client to organize its data, (ii) the client's data (e.g., any number of data portions (e.g., 136, 140), and/or (iii) system metadata (e.g. any number of system metadata portions (e.g., 138)) that includes information regarding any number of logical portions of the client's data. Different blocks of the example backup data (130) may include different types of information.

The arrangement of organization information, client data, and system metadata within each of the blocks may correspond to the manner in which the client organizes its data. For example, if the client runs a first type of operating system, the client may store different portions of the aforementioned types of information in a manner consistent with the first type of operating system. If the client runs a second type of operating system, the client may store different portions of the aforementioned types of information in a manner consistent with the second type of operating system. Thus, the arrangement of organizational information, client data, and system metadata within a backup may be identifiable based on the type of operating system (or other type of data organization system) utilized by the client.

To generate backup maps, embodiments of the invention may provide a method that utilizes system metadata obtained from an operating system of the client. For example, requests for the system metadata may be sent to the operating system or other organizational entity hosted by the client. The system metadata may be used to reconstruct the structure of the client's data and, due to the similar organizational structure of the example backup data (130), the structure of the example backup data (130) (e.g., where each logical portion (e.g., data portion 136, 140) of the example backup data (130) is stored). For additional details regarding generating and/or using backup maps, refer to FIGS. 2-3.

While the example backup data (130) has been illustrated as including data structures including a limited amount of specific information, any of the data structures included in the example backup data (130) may include addition, less, and/or different information without departing from the embodiments of the invention. Any of the aforementioned data structures may be implemented using, for example, lists, tables, linked lists, databases, and/or other types of data structures.

As discussed above, backups, backup maps, and/or backup hierarchies may be stored in backup storage and/or other locations. FIG. 1.4 shows a diagram of an example storage of a backup storage (150) in accordance with one or more embodiments of the invention.

In one or more embodiments of the invention, the example storage of the backup storage (150) is implemented using devices that provide data storage services (e.g., storing data and providing copies of previously stored data). The devices that provide data storage services may include hardware devices and/or logical devices. For example, the example storage of the backup storage (150) may include any quantity and/or combination of memory devices (i.e., volatile storage), long term storage devices (i.e., persistent storage), other types of hardware devices that may provide short term and/or long-term data storage services, and/or logical storage devices (e.g., virtual persistent storage/virtual volatile storage).

For example, the example storage of the backup storage (150) may include a memory device (e.g., a dual in line memory device) in which data is stored and from which copies of previously stored data are provided. In another example, the example storage of the backup storage (150) may include a persistent storage device (e.g., a solid state disk drive) in which data is stored and from which copies of previously stored data is provided. In a still further example, the example storage of the backup storage (150) may include a memory device (e.g., a dual in line memory device) in which data is stored and from which copies of previously stored data is provided and a persistent storage device that stores a copy of the data stored in the memory device (e.g., to provide a copy of the data in the event that power loss or other issues with the memory device that may impact its ability to maintain the copy of the data cause the memory device to lose the data).

The example storage of the backup storage (150) may store any number of backups (152, 160). Each of the backups may be associated with the client (104, FIG. 1.1) or other entities for which backup services are being provided.

Each of the backups may include one or more of a backup (154), a backup map (156), and a backup hierarchy (158). For example, as discussed above, each of the aforementioned data structures may be generated by the client (104, FIG. 1.1) when the backup manager (100, FIG. 1.1) provides backup services to the client (104, FIG. 1.1).

The aforementioned data structures may be used to enable the contents of each of the backups (e.g., 154) to be searched for different portions of data. For example, to search for a portion of data in a backup, an identifier or other information associated with the portion of the data may be matched against data stored in backup maps (e.g., 156) and/or backup hierarchies (e.g., 158). If a match is found, access information corresponding to the match and stored in a backup map or backup hierarchy may be used to access the portion of the data in a corresponding backup.

Alternatively, a match may be used to identify that the portion of the data is present in a corresponding backup without access the portion of the data in the backup. For example, reporting to a requesting entity that the data is present in a backup may cause the requesting entity to further request that an entity corresponding to the backup be restored so that the portion of the data may be accessed via the restored entity.

By providing search services using the backup maps and/or the backup hierarchies, rather than directly searching the contents of the backups, the computational cost for searching may be reduced. However, searching using the backup maps and/or backup hierarchies may be limited to dimensions (e.g., characteristics of portions of backups) supported by the backup maps and the backup hierarchies. For example, the backup maps and the backup hierarchies may include a limited quantity of metadata that specify various characteristics of the portions of the backups. If a search for an unsupported dimension is requested, the backup storage (110, FIG. 1.1) or another entity (e.g., backup manager (100, FIG. 1.1)) that provides search functionality may resort to computationally expensive direct searching of the backups stored in backup storage via, for example, crawling of the backups and direct characterization of the crawled portions of the backups.

Crawling and characterization of the backups may include (i) identifying logical portions of the backups (e.g., files), (ii) extracting characteristics of each of the identified logical portions, and (iii) matching of search criteria to the extracted characteristics of each of the identified logical portions. The characteristics of each of the identified logical portions may be extracted by matching the contents of each of the identified logical portions to types that define different characteristics (e.g., binary patterns).

While the example storage of the backup storage (150) has been illustrated as including data structures that include a limited amount of specific information, any of the data structures included in the example storage of the backup storage (150) may include addition, less, and/or different information without departing from the embodiments of the invention. Any of the aforementioned data structures may be implemented using, for example, lists, tables, linked lists, databases, and/or other types of data structures.

As discussed above, the system of FIG. 1.1 may utilize backups, backup maps, and/or backup hierarchies when providing backup services. FIGS. 2-3 show methods that may be performed by components of the system of FIG. 1.1 to provide backup services.

FIG. 2 shows a flowchart of a method in accordance with one or more embodiments of the invention. The method depicted in FIG. 2 may be used to provide backup generation services in accordance with one or more embodiments of the invention. The method shown in FIG. 2 may be performed by, for example, a backup manager (e.g., 100, FIG. 1.1). Other components of the system in FIG. 1.1 may perform all, or a portion, of the method of FIG. 2 without departing from the invention.

While FIG. 2 is illustrated as a series of steps, any of the steps may be omitted, performed in a different order, additional steps may be included, and/or any or all of the steps may be performed in a parallel and/or partially overlapping manner without departing from the invention.

In step 200, backup data for a client is generated.

In one or more embodiments of the invention, the backup data is generated by sending a message to an agent hosted by the client. In response to receiving the message, the agent hosted by the client may (i) generate the backup data or (ii) invoke backup generation functionality of another entity hosted by the client to generate the backup. For example, applications hosted by the client may include native backup generation functionality that may be used to generate backup data.

The backup data may be used to generate a backup that is searchable without crawling the contents of the backup data. The backup data may include information that (i) reflects all, or a portion, of the state of the client at a point in time or (ii) reflects all, or a portion, of the changes to the state of the client over a period of time.

To generate the backup data, the client may be placed in a consistent state. To do so, buffers or other types of in memory data structures may be flushed (e.g., stored in storage rather than volatile storage). By doing so, the client data stored in storage may reflect the total state of the client at a point in time. Consequently, generated data structures (e.g., backups) based on only the client data stored in storage may reflect the actual state of the client.

In step 202, system metadata from the client corresponding to the backup data is obtained. The system metadata may be obtained from the client by requesting it from an operating system or other organizational entity hosted by the client that manages the client's data. For example, read requests for the system metadata may be sent to the client's operating system. In response to the read requests, the operating system may provide the system metadata.

The system metadata may include information regarding (i) characteristics of each portion of the client's data that corresponds to respective portions of the backup data and/or (ii) access information for each portion of the client's data. Because the client and the backup may employ a similar organizational scheme for storing data, the access information for each portion of the client's data may map to similar access information for accessing similar portions of copies of the client's data stored in the backup data. Consequently, the obtained access information may be used to generate corresponding access information for each portion of the copies of the client's data stored in the backup data.

The characteristics of the portion of the client's data may include, for example, (i) creation time, (ii) last modification time, (iii) last access time, (iv) a full path (e.g., access information) or other type of information that specifies where a portion of the client's data is stored within the storage resources of the client, (v) size, (vi) type, (vii) last modification time of the system metadata, and/or (viii) any other characteristics of the respective portions of the client's data. The characteristics (e.g., searchable dimensions) of the portion of the client's data may be generated based on corresponding portions of the system metadata. The system metadata may be information maintained by the client for its own uses with respect to the client's data.

In step 204, a backup map is generated based on the system metadata. The backup map may be a data structure that includes the information included in the system metadata and (i) associates characteristics of each portion of the system metadata with (ii) access information for the respective portion of client's data.

For example, the backup map may be implemented using a table with two columns. Each row in the table may correspond to a portion of the client's data. The first column in each row may include characteristics of the corresponding portion of the client's data other than access information. The second column in each row may include access information for the corresponding portion of the client's data. The access information may include, for example, a full path or other type of organizational structure.

In step 206, a backup hierarchy is generated based on the backup map. The backup hierarchy may associate (i) characteristics of each portion of the client's data with (ii) access information for portions of the backup that are associated with respective portions of the client's data. For example, as discussed above, different portions of a backup may correspond with different portions of a client's data. The access information included in the backup hierarchy may enable the portions of the backup corresponding to portions of the client's data to be accessed.

For example, the backup hierarchy may be implemented using a table with two columns. Each row in the table may correspond to a portion of the client's data. The first column in each row may include characteristics of the corresponding portion of the client's data other than access information. The second column in each row may include access information for the corresponding portion of the backup that is associated with the corresponding portion of the client's data. The access information may include, for example, an offset, length, and/or other types of information that enable the portion of the backup corresponding to the portion of the client's data to be accessed.

In step 208, the backup, the backup map, and/or the backup hierarchy are stored in backup storage. Once stored in backup storage, the backup storage may aggregate the information included in the backup map and/or the backup hierarchy with information obtained from other backup maps and/or backup hierarchies associated with other backups. Consequently, the aggregated information may be used to search all of the backups stored in the backup storage for relevant information.

Any number of copies of the aggregated backup maps and/or backup hierarchies may be distributed to any number of other entities to enable the other entities to provide search functionality for the data included in the backups stored in the backup storage. For example, the aggregated information from the backup maps and/or backup hierarchies may be provided to a backup manager (100, FIG. 1.1) to enable the backup manager to provide search functionality with respect to backups in backup storage without needing to access information included in the backup storage.

The method may end following step 208.

Throughout the method illustrated in FIG. 2, the backup manager (100, FIG. 1.1) may send messages to the agent (106, FIG. 1.1) to cause the method illustrated in FIG. 2 to be performed. The backup manager (100, FIG. 1.1) may cause the backup, backup map, and/or backup hierarchy to be generated based on protection policies or other information that specifies when backups for entities should be generated to meet data integrity requirements.

By generating the backup, backup map, and/or backup hierarchy as illustrated in FIG. 2, the data stored in the generated backup may be searched in a computationally efficient manner that does not require the contents of the backup to be indexed via crawling or other computationally expensive methods. Consequently, the computational cost for providing backup services including search functionality may be reduced.

Different portions of the method in FIG. 2 may be performed by any number of entities. For example, the backup hierarchy may be generated by the client, the backup manager, and/or the backup storage. Thus, the workload for generated the aforementioned data structures described with respect to FIG. 2 may be distributed across the system depending on the workloads of different portions of the system.

As noted above, providing backup services may include searching the backups for relevant information. To provide search services, embodiments of the invention may utilize backup maps and/or backup hierarchies rather than directly searching the contents of the backups. Turning to FIG. 3, FIG. 3 shows a flowchart of a method in accordance with one or more embodiments of the invention. The method depicted in FIG. 3 may be used to provide search functionality in accordance with one or more embodiments of the invention. The method shown in FIG. 3 may be performed by, for example, a backup manager or a backup storage (e.g., 100, 110, FIG. 1.1). Other components of the system in FIG. 1.1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, backup data (e.g., a backup), a backup map, and/or a backup hierarchy associated with the backup and that are each associated with a client are obtained. The backup, backup map, and/or the backup hierarchy may be obtained from the client. For example, the client or another entity may send the backup, backup map, and/or backup hierarchy to a backup storage for storage.

In step 302, a search request, for the client, for a portion of data is obtained. The portion of data may be any type of data. For example, the portion of data may be a document.

The search request may be obtained from another entity via a message. The search request may request whether the portion of the data is available for access. The search request may generally request whether any entity (e.g., a client) may provide access to the portion of data or whether a specific entity (i.e., the client) may provide access to the portion of data.

In step 304, the backup data (i.e., a backup) is searched for the data using only the backup map and/or the backup hierarchy to obtain a search result. In other words, the backup is not searched directly. Rather, the search request is serviced by determining whether any information included in the backup map and/or backup hierarchy indicates that the portion of the data is included in the backup.

For example, an identifier of the portion of the data may be matched to identifiers (e.g., file names) included in the backup map and/or backup hierarchy. In another example, a creation date associated with the portion of the data may be matched to creation times included in the backup map and/or backup hierarchy. If a match is found, it may be determined that the portion of the data is included in the backup.

The search result may reflect the outcome of the determination. For example, if it is determined that the portion of the data is included in the backup, the search result may (i) indicate that the portion of the data is available, (ii) may specify from which entity the portion of the data may be accessed, (iii) may include the portion of the data (e.g., may be read from the backup using access information corresponding to the portions of the data and/or included in the backup hierarchy), and/or (iv) may include other types of information regarding the portion of the data. If it is determined that the portion of the data is not included in the backup, the search result may indicate that the portion of the data is inaccessible from the client associated with the backup.

In step 306, the search request is serviced based on the search result. For example, a message based on the search result may be provided to the requesting entity in response to the search request. The message may, for example, include the search result and/or information based on the search result.

The method may end following step 306.

Thus, via the method illustrated in FIG. 306, search functionality for data included in the backups in backup storage may be provided in a computationally efficient manner by utilizing information included in backup maps and/or backup indexes associated with backups of any number of entities. By doing so, search results may be generated without resorting to computationally expensive methods of searching data included in the backups such as, for example, crawling the backups.

In some embodiments of the invention, a requesting entity, after the search request is serviced, may request that an entity associated with a backup that includes the desired data be restored. By having the entity be restored, the requesting entity may be able to access the desired data by sending requests to the restored entity for the desired data.

For example, in some scenarios, a search result may indicate that desired data is available from an entity that is unavailable. If the entity is unavailable, the entity may be restored to place the entity in an available state so that the desired data may be accessed via the available entity.

To further clarify embodiments of the invention, a non-limiting example is provided in FIGS. 4.1-4.4. FIG. 4.1 may illustrate a system similar to that illustrated in FIG. 1.1. FIGS. 4.2-4.4 may illustrate interactions between components and/or actions performed by the components of the system of FIG. 4.1 over time. For the sake of brevity, only a limited number of components of the system of FIG. 1.1 are illustrated in each of FIGS. 4.1-4.4.

Example

Consider a scenario as illustrated in FIG. 4.1 in which a backup manager (400) is providing backup services to a client (402). When providing backup services, the backup manager (400) may orchestrate storage of backups in a backup storage (404).

Turning to FIGS. 4.2-4.4, the aforementioned figures illustrate interactions and actions between components of the system of FIG. 4.1. In these figures, the relative occurrence in time of the interactions progresses from the top of each figure (i.e., earlier in time) to the bottom of each figure (i.e., later in time). FIG. 4.4 is a continuation of the diagram of FIG. 4.3. In other words, element 410 indicates the first interaction that occurs in time while element 440 indicates the last interaction that occurs.

Turning to FIG. 4.2, at a first point in time, the backup manager (400) initiates a backup generation (410) for the client (402). The backup manager (400) may initiate the backup generation (410) to meet a data protection policy requirement. The backup manager (400) may initiate a backup generation (410) by sending a message to an agent hosted by the client (402).

In response to initiation of the backup generation (410), the agent generates backup data (412). The generated backup data may be any type of backup. For example, the backup data may be an image of the client (402).

After generating the backup, system metadata (414) is obtained. The system metadata (414) is obtained by requesting it from an operating system hosted by the client (402).

After obtaining the system metadata (414), a backup map (416) is generated based on the system metadata. The backup map (416) includes metadata regarding portions of the client's data and corresponding access information for the portions of the client's data.

After obtaining the backup map (416), a backup hierarchy (418) is generated based on the backup map (416). The backup hierarchy (418) is generated by mapping the access information included in the backup map (416) to corresponding portions of the backup data (412). The mapping results in the generation of access information for various portions of the backup data (412) including offsets and lengths that specify the start/length of each portion of the client data in the backup data (412).

After generating the backup hierarchy (418), the backup data, backup map, and backup hierarchy are provided (420) to the backup storage (404). The backup storage (404) stores (422) the backup map, backup map, and backup hierarchy in response to being provided the aforementioned data structures.

Turning to FIG. 4.3, after the aforementioned data structures are stored in the backup storage (404), a client failure (423) occurs. Consequently, the client (402) is unavailable following the client failure (423).

After the client failure (423) occurs, the backup manager (400) obtains a request for data (424). In response to obtaining the request for the data (426), the backup manager (400) sends a search request for the data (426) to the backup storage (404) to service the request for the data (424).

In response to receiving the search request for the data (426), the backup storage (404) searches the backup hierarchy for the data (428) to generate a search result. In this example, the search result indicates that the requested data is present in the backup. Consequently, the backup storage (404) identifies that the data is present in the backup data (430) associated with the client.

However, because the client (402) is unavailable due to the client failure (423), the data is inaccessible via the client (402). To enable access to the data, the backup storage (404) initiates a restoration of the client to enable access to the data.

To restore the client (402), the backup storage (404) sends the backup data (432) to the client (402) and sends a client instantiation request (434) to an agent hosted by a computing device that also hosts the client (402). In response to receiving the aforementioned data and request, the agent (not illustrated) hosted by the client (402) instantiates the client using the backup data (436). To do so, the agent modifies the data of the client (402) to reflect the data included in the backup data (436) and enables execution of the client (402).

Once restored, the client (402) is now in an available state and, consequently, is able to provide access to its data to other entities, including the data which was previously requested.

Turning to FIG. 4.4, after the client is available, the backup manager (400) sends a data request (438) to the client (402) for the data that was previously requested. In response, the client (402) provides the data (440) to the backup manager. Using the data (440), the backup manager (400) services the search request by providing a copy of the data (440) to the requesting entity.

End of Example

Thus, as illustrated in FIGS. 4.1-4.4, embodiments of the invention may provide a method for providing backup services in a manner that is computationally efficient. For example, the backup was stored in a searchable format (i.e., with an associated backup map/backup hierarchy) that enabled the contents of the backup to be searched without crawling the backup.

Figure 5:
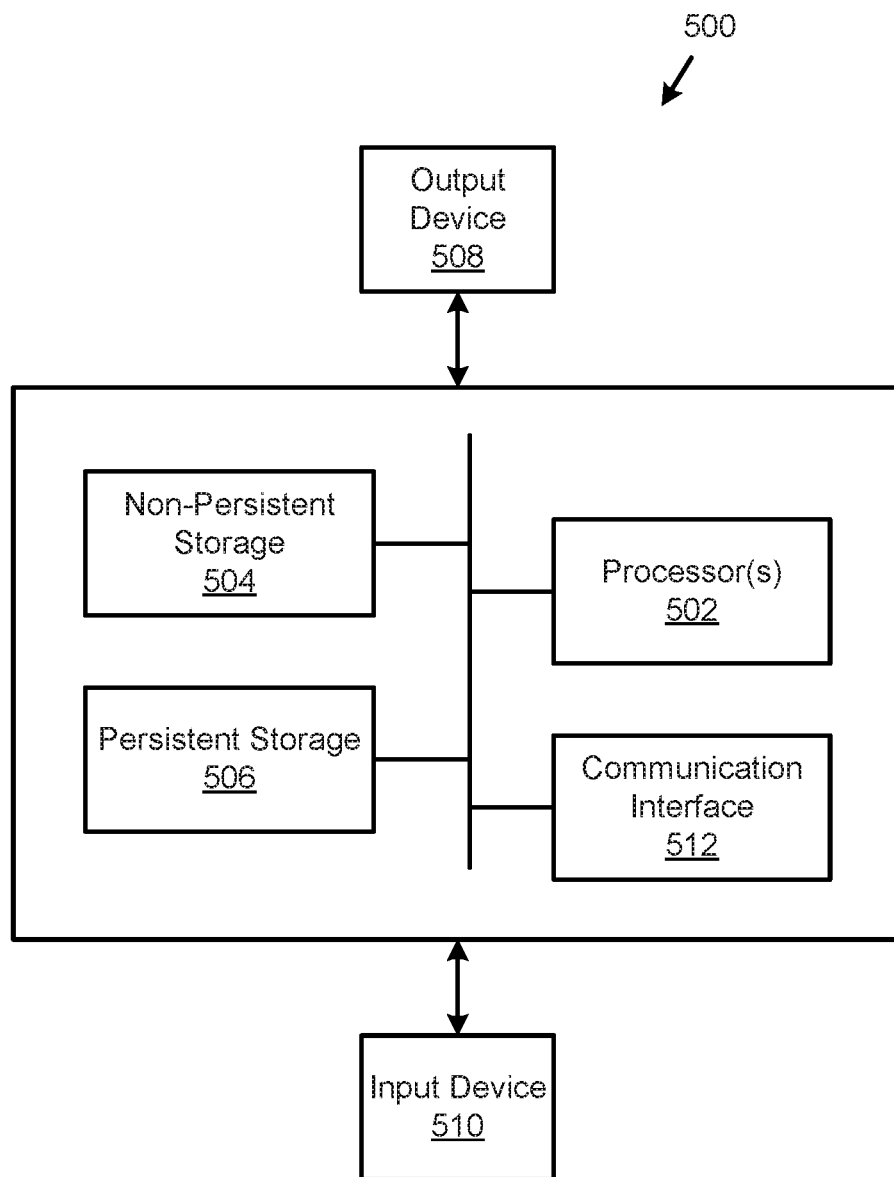
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a method for providing backup services. To do so, embodiments of the invention may provide a system that generates searchable backups in a computationally efficient manner. To place the backups into a format that enables computational efficient searching, system metadata may be obtained from an entity for which the backup is generated. The system metadata may be utilized to identify different logical portions of the backup and identify relevant characteristics of each of the portions of the backups. By doing so, the computational cost for placing generated backups in a searchable format may be reduced when compared to directly searching the backups to identify relevant characteristics of the backups.

Thus, embodiments of the invention may address the problem of limited computational resource availability for providing backup services in a distributed environment.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A computing device that comprises a backup manager for providing backup services, the backup manager comprising:
   persistent storage for storing protection policies; and
   a backup orchestrator programmed to:
   generate a backup for a client based on the protection policies;
   obtain system metadata from the client, wherein the system metadata specifies information regarding data stored on the client;
   generate a backup map for the backup based on the system metadata, wherein the backup map is generated without crawling data of the client, and the backup map specifies at least locations of logical portions of the data of the client within the backup;
   generate a backup hierarchy for the backup by crawling the system metadata within the backup map to extract identifiers and access information from the system metadata, wherein the backup hierarchy comprises the extracted identifiers and the access information for the logical portions of the data of the client stored in the backup, wherein the extracted identifiers include file names;
   store the backup, the backup hierarchy, and the backup map;
   obtain a request for data;
   search the backup for the data using the backup hierarchy and the backup map, without using the backup, to obtain a search result; and
   service the request using the search result.

2. The backup manager of claim 1, wherein servicing the request using the search result comprises:
   obtaining information regarding a portion of the backup based on the search result; and
   providing the information regarding the portion of the backup to a requesting entity.

3. The backup manager of claim 1, wherein the backup map comprises metadata associated with each of the logical portions of data of the client.

4. The backup manager of claim 1, wherein the backup comprises:
   copies of each of the logical portions of data of the client;
   at least a portion of the system metadata corresponding to each of the logical portions of the data of the client; and
   access information for the copies of each of the logical portions of the data of the client.

5. The backup manager of claim 1, wherein the backup map is generated without crawling the backup.

6. A method for providing backup services, comprising:
   generating a backup for a client based on a protection policy associated with the client;
   obtaining system metadata from the client, wherein the system metadata specifies information regarding data stored on the client;
   generating a backup map for the backup based on the system metadata, wherein the backup map is generated without crawling data of the client, and the backup map specifies at least locations of logical portions of the data of the client within the backup;
   generating a backup hierarchy for the backup by crawling the system metadata within the backup map to extract identifiers and access information from the system metadata, wherein the backup hierarchy comprises the extracted identifiers and the access information for the logical portions of the data of the client stored in the backup, wherein the extracted identifiers include file names;
   storing the backup, the backup hierarchy, and the backup map;
   obtaining a request for data;
   searching the backup for the data using the backup hierarchy and the backup map, without using the backup, to obtain a search result; and
   servicing the request using the search result.

7. The method of claim 6, wherein servicing the request using the search result comprises:
   obtaining information regarding a portion of the backup based on the search result; and
   providing the information regarding the portion of the backup to a requesting entity.

8. The method of claim 6, wherein the backup map comprises metadata associated with each of the logical portions of data of the client.

9. The method of claim 6, wherein the backup comprises:
   copies of each of the logical portions of data of the client;
   at least a portion of the system metadata corresponding to the logical portions of the data of the client; and
   access information for the copies of each of the logical portions of the data of the client.

10. The method of claim 6, wherein the backup map is generated without crawling the backup.

11. A non-transitory computer readable medium comprising computer readable program code, which when executed by a computer processor enables the computer processor to perform a method for providing backup services, the method comprising:
    generating a backup for a client based on a protection policy associated with the client;
    obtaining system metadata from the client, wherein the system metadata specifies information regarding data stored on the client;
    generating a backup map for the backup based on the system metadata, wherein the backup map is generated without crawling data of the client, and the backup map specifies at least locations of logical portions of the data of the client within the backup;
    generating a backup hierarchy for the backup by crawling the system metadata within the backup map to extract identifiers and access information from the system metadata, wherein the backup hierarchy comprises the extracted identifiers and the access information for the logical portions of the data of the client stored in the backup, wherein the extracted identifiers include file names;
    storing the backup, the backup hierarchy, and the backup map;
    obtaining a request for data;
    searching the backup for the data using the backup hierarch and the backup map, without using the backup, to obtain a search result; and
    servicing the request using the search result.

12. The non-transitory computer readable medium of claim 11, wherein servicing the request using the search result comprises:
    obtaining information regarding a portion of the backup based on the search result; and
    providing the information regarding the portion of the backup to a requesting entity.

13. The non-transitory computer readable medium of claim 11, wherein the backup map comprises metadata associated with each of the logical portions of data of the client.

14. The non-transitory computer readable medium of claim 11, wherein the backup comprises:
copies of each of the logical portions of data of the client;
at least a portion of the system metadata corresponding to each of the logical portions of the data of the client; and
access information for the copies of each of the logical portions of the data of the client.

\* \* \* \* \*